United States Patent [19]

Bostick et al.

[11] Patent Number: 4,528,669
[45] Date of Patent: Jul. 9, 1985

[54] COMBINED AM/FM LASER RADAR TRANSMITTER

[75] Inventors: Hoyt A. Bostick, Newport Beach; Carl J. Buczek, Encinitas, both of Calif.

[73] Assignee: Ford Aerospace & Communications Corporation, Detroit, Mich.

[21] Appl. No.: 561,766

[22] Filed: Dec. 15, 1983

[51] Int. Cl.$^3$ .................................................. H01S 3/10
[52] U.S. Cl. .................................... 372/26; 372/28; 372/31; 372/32
[58] Field of Search ...................... 372/26, 28, 29, 32, 372/33, 31, 105, 102, 19, 20

[56] References Cited

U.S. PATENT DOCUMENTS

| | | | |
|---|---|---|---|
| 3,229,223 | 1/1966 | Miller | 331/94.5 |
| 3,487,230 | 12/1930 | Costich | 307/88.3 |
| 3,569,856 | 3/1971 | Ridgway | 331/94.5 |
| 3,593,188 | 7/1971 | Nussmeier | 378/26 |
| 3,622,912 | 11/1971 | Doyle et al. | 331/94.5 |
| 3,918,007 | 11/1975 | Waksberg | 331/94.5 |
| 3,940,712 | 2/1976 | White | 378/28 |

OTHER PUBLICATIONS

Guser et al.; "Temperature Stabilization of Optical FM-AM Discriminator", Izu Vyssh Uchebn Zaved Priborostr., vol. 23, No. 8, Aug. 1980, p.66.
Skolnik, M. I., Introduction to Radar Systems (2d ed. 1980), McGraw-Hill Book Company, pp. 95-100.

Primary Examiner—William L. Sikes
Assistant Examiner—Léon Scott, Jr.
Attorney, Agent, or Firm—Edward J. Radlo; Robert D. Sanborn

[57] ABSTRACT

A laser radar transmitter (2) has, associated with a single active lasing region (11) and preferably in the same laser cavity (1) therewith, an amplitude modulator (21) and a frequency modulator (25), which may simultaneously place continuous AM and continuous FM on a single output beam (7). Amplitude modulator (21) is preferably an EO crystal having a high EO coefficient, low loss, and field-induced birefringence. Frequency modulator (25) is preferably an EO crystal having a high EO coefficient, low loss, and a field-induced index change. Applying a d.c. driving voltage to the AM crystal (21) and an a.c. driving voltage to the FM crystal (25) produces an output beam (7) having FM. Applying an a.c. driving voltage to the AM crystal (21) produces an output beam (7) having AM, independently of whether FM is added by means of applying an a.c. driving voltage to the FM crystal (25).

10 Claims, 3 Drawing Figures

COMBINED AM/FM LASER RADAR TRANSMITTER

TECHNICAL FIELD

This invention pertains to the field of continuously amplitude and frequency modulating a laser beam adapted for use as a radar transmitter.

BACKGROUND ART

U.S. Pat. No. 3,593,188 discloses techniques for amplitude and frequency modulating a $CO_2$ laser, but does not disclose the combination of amplitude modulation (hereinafter "AM") and frequency modulation (hereinafter "FM") of a single laser beam as in the present invention.

U.S. Pat. No. 3,940,712 shows AM and FM of a laser. However, the present invention differs from this patent in that (1) AM and FM of a laser can be simultaneously present; (2) electro-optic (hereinafter "EO") crystals are used, rather than slow mechanical modulators; (3)the amplitude modulator is preferably disposed within the laser cavity, providing for a more efficient system than for the outboard amplitude modulator of the patent.

U.S. Pat. No. 3,569,856 shows FM of a laser, but not AM.

U.S. Pat. Nos. 3,918,007; 3,229,223; 3,487,230; and 3,622,912 disclose techniques for AM of a laser, but not FM.

With respect to the systemic aspects of the present invention, a brief tutorial on sinusoidal AM and FM radar is appropriate. In sinusoidal AM radar, the measurement of range between the transmitter and the target depends upon a determination of the phase difference between the sinusoidal AM signals received and transmitted. The accuracy of this measurement of the phase difference depends upon the signal-to-noise ratio in the radar receiver, which is in turn a function of transmitter power, output beam aperture, and pixel scan rate. In general, absolute range is uncertain with a sinusoidal AM radar. The absolute range resolution is subject to a range ambiguity interval (or "ambiguity range" $r_a$), which is determined by the frequency of the sinusoidal AM. For a sinusoidal AM radar, the ambiguity range $r_a = c/2f_m$ where c is the speed of light and $f_m$ is the modulating frequency. As $f_m$ gets higher, the absolute resolution gets better (smaller), but the ambiguity range undesirably gets lower as well.

In an FM radar, on the other hand, the measurement of range depends upon a determination of the frequency difference between the signal received and the signal transmitted. Because of the phase decorrelation of the received signal as a result of scanning over the scattering target area (which problem is particularly acute for laser radars, because they must scan at high pixel rates relative to microwave radar to cover the same angular field of view), the spectral width of the received signal is broadened by approximately the reciprocal of the pixel dwell time. For a typical laser radar, the amount of broadening is between 50 Khz and 500 Khz. This limits the accuracy and resolution that can be achieved in the receiver. If one considers the FM rates possible in a laser transmitter, this corresponds to a range accuracy of between 30 meters and 200 meters. Thus, an FM radar typically has worse range resolution than an AM radar. However, it does not have the ambiguity difficulties and the backscatter problems inherent in the AM radar.

The primary prior art approach for removing ambiguities in a microwave sinusoidal AM radar system is to send discrete pulses of sinusoidal AM at stepped frequencies. By contrast, the present invention is capable of simultaneously modulating a radar beam with continuous AM and continuous FM. This offers the following advantages over the prior art: (1) Absolute range is measured, thus intervening atmospheric backscatter can be discriminated against. (2) Ranging and imaging of moving targets is facilitated, since the change in the frequency excursion, $\Delta f$, of an individual sample is twice the Doppler frequency shift attributable to target motion. (3) The prior art approach would be difficult to implement in a laser: step or discrete changes in the frequency of a laser are difficult because these require very fast optical or mechanical changes in the laser cavity optical path length. (4) The power required to activate the amplitude and frequency modulators (21, 25) in this invention is less than for other prior art techniques including pulse compression methods using very high FM chirps.

In a second prior art technique for eliminating the range ambiguities associated with AM radar, the AM is transmitted at several frequencies simultaneously. This technique is popular for visible lasers, but would use vastly more power than the present invention.

These prior art systems are discussed in Skolnik, M. I., *Introduction to Radar Systems* (2d ed. 1980), McGraw-Hill Book Company, pp. 95-100.

In summary, the prior art does not suggest the combination of continuous amplitude and continuous frequency modulation of a single radar beam.

DISCLOSURE OF INVENTION

The transmitter (2) of the present invention advantageously combines AM radar and FM radar is a single instrument. The combination of AM and FM makes possible a radar in which the AM can be used advantageously to provide high resolution relative ranging information and the FM can be used to avoid the range ambiguities and the backscatter associated with the AM. These backscatter problems are more severe for laser radar than for microwave radar. Thus, the invention is particularly well-suited for three-dimensional laser imaging and ranging.

When both the amplitude modulator (21) and the frequency modulator (25) are activated simultaneously, the waveforms produced by these two modulators (21, 25) are synchronized. This permits the FM'ed portion of the output beam (7) to remove the ambiguity from the AM'ed portion of the return signals. This provides a capability to measure absolute range during one pixel dwell time with fine accuracy: for example, one meter out of a total range of a few kilometers. Either AM or FM can be used separately in transmitter (2), or AM and FM can be combined, as required.

In the preferred laser embodiment, amplitude modulator (21) and frequency modulator (25) are aligned along the same optical axis (5) as a beam (6) of circulating coherent radiation pumped by an active lasing region (11) such as a waveguide section. The amplitude modulator (21), frequency modulator (25), and active lasing region (11) are preferably situated within a single laser cavity (1).

A beam splitter (23), intersecting the optical axis (5) and angularly disposed at the Brewster angle with respect thereto, diverts some of the circulating radiation (6) away from the optical axis (5) and onto a new path (8) where it exits the cavity (1) via a dielectric window (43) in the housing (3) surrounding the laser cavity (1). This diverted radiation becomes the output beam (7), which can be amplitude modulated, frequency modulated, or both, depending upon whether the amplitude modulator (21), the frequency modulator (25), or both the amplitude and frequency modulators (21, 25) have driving voltages applied thereto, and whether these voltages are a.c. or d.c.

The amplitude modulator (21) is preferably an EO crystal having field induced birefringence, a high EO coefficient, and low loss. The frequency modulator (25) is preferably an EO crystal having a field-induced index change, a high EO coefficient, and low loss.

In an important aspect of this invention, the AM crystal (21) is prevented from producing FM by its own action. This is accomplished by orienting the AM crystal (21) in such a manner that the E-vector of the circulating radiation (6) (the P-wave) bisects the two orthogonal field-induced axes of birefringence of the crystal (21) (each of these induced axes is orthogonal to the optical axis (5)).

A wavelength selective device (27), such as a Littrow grating, may be disposed along the optical axis (5) for purposes of selecting the wavelength of operation and diverting a portion of the circulating radiation (6) out of the cavity (1) via a second dielectric window (45) in the housing (3). This diverted beam (9) may be advantageously used for diagnostic purposes and, after suitable polarization rotation, as a local oscillator for an associated laser receiver which receives the return signals from the laser transmitter (2) of the present invention.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
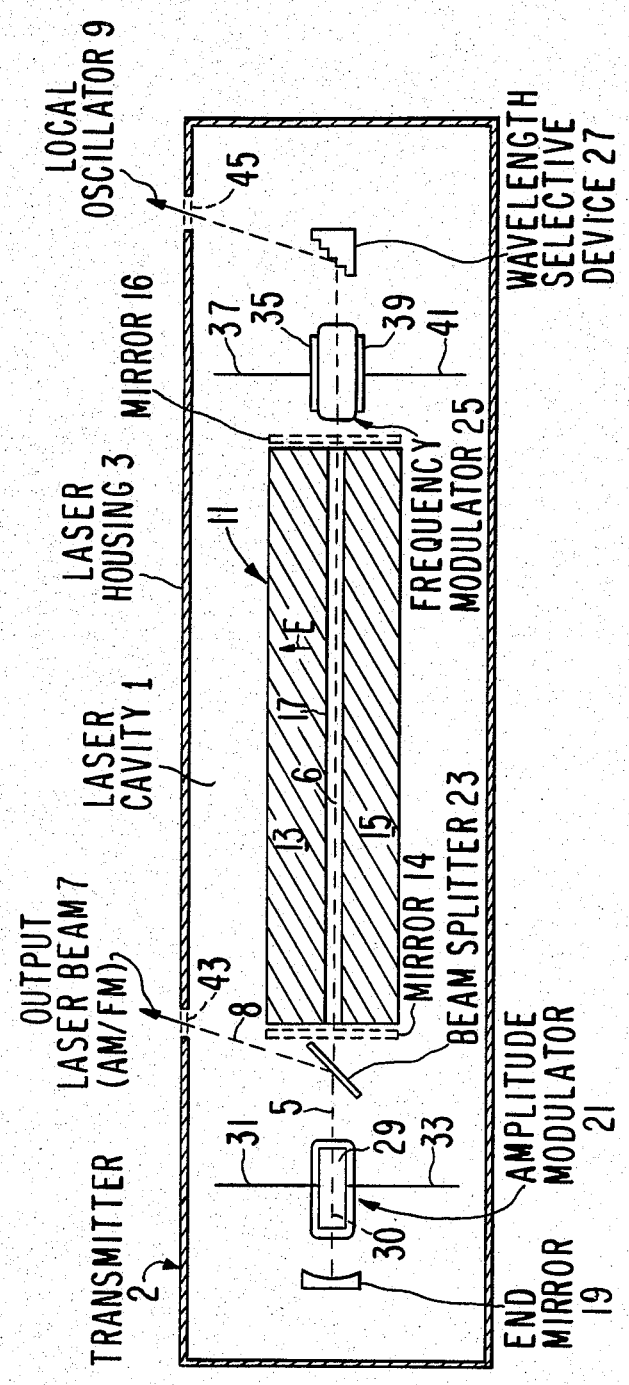
FIG. 1 is a simplified, partially broken-away top view of a preferred embodiment of a laser radar transmitter (2) constructed in accordance with the teachings of the present invention.

Transmitter 2 comprises an electrically conductive (e.g., aluminum or Invar) housing 3 surrounding and defining a resonant laser cavity 1 which is filled with a lasing element such as $CO_2$ gas with added nitrogen and helium. The gain portion of transmitter 2 is provided by an active lasing region 11 which is shown as a pumped waveguide section, although other structures may be used. The waveguide section 11 employs a first electrode 13 and a second electrode 15 surrounding an elongated orifice 17 which typically has a square cross-section. The principal axis (optical axis 5) of the beam 6 of circulating coherent radiation pumped by the active lasing region 11 is coincident with the center longitudinal axis of orifice 17. By means of an optional "coupled-cavity" technique, partially reflective/partially transmissive mirrors 14, 16 may be placed just outside opposing ends of region 11 in order to increase the net gain of region 11.

AM crystal 21 is positioned at one end of region 11, preferably within cavity 1 for reasons of efficiency, although crystal 21 could be positioned outside cavity 1 and communicate therewith by means of a dielectric window in housing 3. Crystal 21 is aligned with the optical axis 5 as will be more fully described below, and is proximate to region 11. End mirror 19, which is preferably an enhanced metallic or dielectric reflector providing greater than 99.5% reflectivity, is also aligned with optical axis 5 in such a way that crystal 21 is intermediate mirror 19 and region 11.

Region 11 produces a beam 6 of circulating coherent radiation that is linearly polarized horizontally in FIG. 1, i.e., it has its E-vector lying in the plane of FIG. 1 and orthogonal to the optical axis 5, as shown. This beam 6 of circulating coherent radiation is known as the P-wave. The H-vector of the P-wave 6 is orthogonal to the plane of FIG. 1.

Intersecting the optical axis 5 is a planar beam splitter 23 fabricated of a low loss material such as zinc selenide or gallium arsenide. When splitter 23 is positioned intermediate region 11 and modulator 21 as shown, AM crystal 21 is desirably able to modulate radiation traveling in both directions along optical axis 5. Beam splitter 23 is angled with respect to the optical axis 5 at the Brewster angle of its constituent material. As such, the P-wave 6 travels through splitter 23 along the optical axis 5 with very little attenuation. However, components of radiation that are orthogonal to the P-wave 6 (said orthogonal components produced by AM crystal 21) are reflected off splitter 23 along path 8 whereupon they exit cavity 1 via dielectric window 43 formed in conductive housing 3. These diverted orthogonal components are known as the S-wave and become the output beam 7 of the transmitter 2.

FM crystal 25 is aligned with the optical axis 5 as more fully described below, and can be positioned on either the left side or the right side of region 11. If positioned on the left side of region 11, FM crystal 25 is preferably placed so that the circulating P-wave 6 encounters FM crystal 25 before it encounters beam splitter 23.

A wavelength selective device 27, e.g., a Littrow grating, may be advantageously employed in which case it is aligned along the optical axis 5 and is preferably located such that FM crystal 25 is intermediate region 11 and device 27. Device 27 normally is constructed so that it reflects one line of radiation, usually line $P_{20}$ for a $CO_2$ laser because it is the highest gain transition for $CO_2$ gas, back along optical axis 5. Other wavelengths are attenuated within device 27, which diverts a small portion (just enough to provide for diagnostics and a suitable local oscillator) of the P-wave 6 away from axis 5. This diverted beam 9 passes through cavity 1 via a second dielectric window 45 in housing 3, and may be advantageously employed, after suitable polarization rotation, as the local oscillator for a companion laser receiver disposed to receive the return signals 7 transmitted by transmitter 2 and reflected from the target.

Prior to utilization of beam 9, AM sidebands may be removed therefrom. These sidebands can be caused by: (1) beam splitter 23 being less than perfect, allowing some S-plane energy to pass therethrough; (2) amplitude ripple on the P-wave 6 caused by AM crystal 21; and/or (3) the fact that, as FM crystal 25 is driven, the gain of region 11 as a function of frequency is not constant.

In lieu of device 27, a highly reflective mirror such as end mirror 19 can be used.

Figure 2:
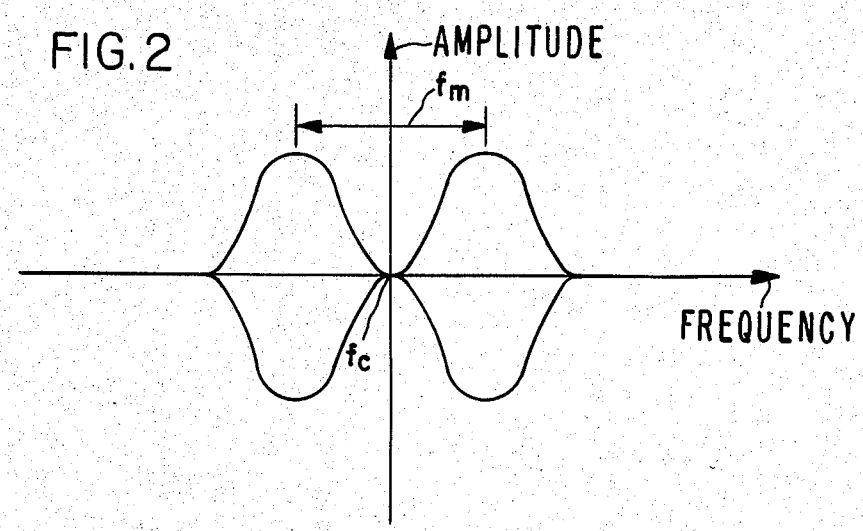
FIG. 2 is a modulation pattern of a typical amplitude modulated output beam (7) produced by the transmitter (2) of FIG. 1.

Sandwiching AM crystal 21 are two electrically conductive electrodes 29 and 30. (The lower electrode 30 is hidden behind crystal 21 in FIG. 1 and therefore is illustrated using a dotted lead line). Driving voltage is applied to electrode 29, 30 via conductive paths (e.g., wires) 31 and 33, respectively. (Power supplies for crystals 21, 25 and for region 11 are not shown in FIG. 1). An alternating current (hereinafter "a.c.") driving voltage applied between electrodes 29 and 30 will produce 100% modulation. This causes output beam 7 to be a double sideband, suppressed carrier signal, and is illustrated in FIG. 2, where $f_c$ is the carrier frequency of both the P-wave and the S-wave. $f_m$, the modulating frequency of the AM, corresponds to twice the frequency of the a.c. applied between electrodes 29 and 30. A typical value for $f_m$ is 8 Mhz. 100% modulation is normally desired for the AM portion of output signal 7 because the usable information in an AM radar signal is in the sidebands and not in the carrier. If direct current (hereinafter "d.c.") is applied between electrodes 29 and 30, the output beam 7 is 0% modulated, i.e., it consists solely of a carrier. 0% modulation is desirable when pure FM (from FM modulator 25), and no AM, on output beam 7 is desired. A combination of a.c. and d.c. can be applied between electrodes 29 and 30 as desired.

The "conversion percentage" is the percentage of the P-wave 6 power that is orthogonally polarized and rotated by AM crystal 21, and therefore, ignoring losses in beam splitter 23, is the percentage of power in the S-plane leaving cavity 1 as output beam 7. It is normally desired for the conversion percentage to be between 5% and 10%. A higher conversion percentage would cause unwanted attenuation of the P-wave 6. Generally speaking, the power loss within cavity 1 plus the power exiting cavity 1 as output beam 7 must balance the power gain attributable to region 11.

The conversion percentage of AM crystal 21 is a function of its EO coefficient, the driving voltage applied between electrodes 29 and 30, and the length of the AM crystal 21 along the optical axis 5. It is desired for the EO coefficient of modulator 21 to be high. The figure of merit $n_o^3 R_{41}$ should be at least $10^{-10}$, where $n_o$ is the zero-field index of refraction and $R_{41}$ is the unclamped EO coefficient of crystal 21.

Crystals 21 and 25 should also have low loss to prevent the crystals 21, 25 from overheating and to maintain efficiency: in the absence of driving voltage applied thereto, it is desired that crystals 21, 25 have no effect on the circulating beam 6. Thus, the absorption coefficient of crystals 21, 25 should be as small as possible. Cadmium telluride having an absorption coefficient of 0.005 cm$^{-1}$ is suitable for crystals 21, 25 for many applications. Cadmium telluride also allows for high speed and wideband FM frequency excursions, thus permitting the advanced signal processing methods demanded by laser radar.

To further minimize heat losses, crystals 21, 25 and lasing region 11 should be heat sunk to a thermal reservoir (not illustrated). Water-cooled techniques can enable transmitter 2 to provide a high quality output power of about 20 watts. Additionally, anti-reflective coatings should be applied to crystals 21, 25 to match the circulating beam 6 into the crystals 21, 25 with as little loss as possible.

Crystals 21 and 25 must exhibit field (i.e., driving voltage) induced birefringence. In order to rotate the plane of polarization of radiation incident upon it to produce AM, yet not produce FM, crystal 21 must be oriented so that the change in field-induced index of refraction of the S-wave incident thereon is equal in magnitude and opposite in sign to the change in the field-induced index of refraction of the P-wave incident thereon. By this technique, the AM produced by crystal 21 is pure AM, i.e., the carrier frequency $f_c$ is not changed by the action of AM crystal 21, thus making it easier for the associated receiver to demodulate the return signals than if crystal 21 put any FM on output beam 7.

Crystal 25, since it must produce FM by changing the optical path length over time, must be oriented so that the change in field-induced index of refraction of the S-wave incident thereon is equal in magnitude and equal in sign to the change in the field-induced index of refraction of the P-wave incident thereon. Oriented in this manner, FM crystal 25 theoretically does not change the polarization of circulating radiation 6 incident thereon, and thus, as desired for reasons of receiver simplicity, does not impart any AM to beam 6. In reality, some small AM is introduced by the FM crystal 25, owing to the fact that the gain of region 11 as a function of frequency is not constant. This problem can be alleviated by increasing the gas pressure within cavity 1 to about 0.5 atmosphere (for $CO_2$) and/or decreasing the frequency excursion $\Delta f$ imparted by FM crystal 25. The latter method, however, worsens the absolute range resolution and for this reason the frequency excursion $\Delta f$ is usually made as high as practicable, e.g., on the order of 25 Mhz.

Figure 3:
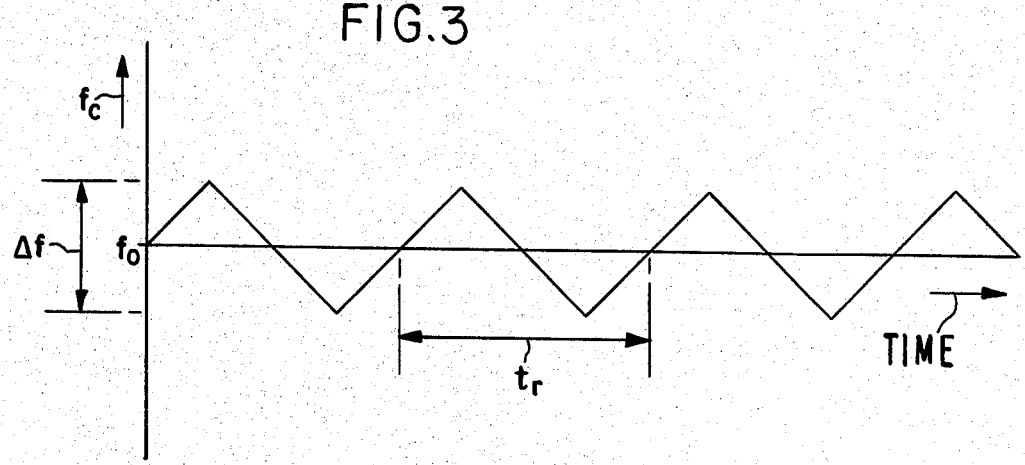
FIG. 3 is an exemplary FM waveform output beam (7) produced by the transmitter (2) of FIG. 1.

Frequency modulator 25 is almost never placed outside cavity 1. As with crystal 21, and for the same reasons, modulator 25 is preferably an EO crystal having a high EO coefficient and low loss. Driving voltage is applied to crystal 25 by means of conductive electrodes 35 and 39 sandwiching crystal 25 as shown. The driving voltage, which must be a.c., is applied to electrodes 35, 39 from a power supply (not illustrated) via conductors (e.g., wires) 37 and 41, respectively. When a.c. is applied to FM crystal 25 and d.c. is applied to AM crystal 21, the resulting output beam 7 is illustrated in FIG. 3, in which $f_c$ is the carrier frequency, $f_0$ is the unmodulated carrier frequency, and $t_r$ is the ramp interval. $f_r = 1/t_r$ is the ramp frequency, which is equal to the frequency of the a.c. driving voltage applied between electrodes 35 and 39. $f_r$ is typically on the order of one Khz. As $f_r$ increases, the range accuracy improves, but at the expense of added complexity in the associated receiver. The frequency excursion $\Delta f$ is proportional to the length of crystals 25 along optical axis 5, the EO coefficient of crystal 25, and the driving voltage applied thereto.

It is desirable to center the operating frequency $f_o$ of the transmitter 2 about the line center of the selected laser transition of the molecule of the gas in cavity 1. This provides power symmetry as FM crystal 25 proceeds through its sawtooth waveform, and maximizes gain, and can be accomplished by biasing crystal 25 by means of a piezoelectric crystal, mounted beneath either mirror 19 or device 27, which is tuned by applying a voltage thereto, thereby changing the optical path length along optical axis 5.

In use in a laser radar, transmitter 2 is positioned so that output beam 7 points towards the target. The field of view in a plane orthogonal to beam 7 is divided into a number of spatial resolution elements or pixels. As many as 100,000 pixels can be used. On the other hand, a single pixel can be used in, e.g., a rangefinder application. The total number of pixels in the field of view is arbitrary and can be dynamically programmable, e.g., by a computer, depending upon mission requirements. For example, if the radar is used for navigation purposes, a relatively small number of pixels is adequate. On the other hand, if the radar is used for target designation or damage assessment, the number of pixels can be increased.

The output beam 7 is deflected so that it scans the pixels at the rate of up to approximately $10^5$ pixels per second. The deflection can be caused by a mechanical raster scan using a rotating mirror. The return signal from each pixel contains an amplitude proportional to grey scale and a phase used to give a relative range with respect to the adjacent pixel.

The AM and the FM do not have to be activated simultaneously. Just the FM might be sufficient for, e.g., coarse navigation, presumably with multiple pixels. A computer can be programmed to decide, based upon image processing algorithms, whether to activate the AM and/or FM, and/or whether to reprogram the number of pixels. When just AM is used, or when a combination of AM and FM is used, the driving voltage applied to electrodes 29, 30 is usually pure a.c., although d.c. could be mixed in if desired. On the other hand, when it is desired for just FM to be present on output beam 7, the driving voltage applied to electrodes 29, 30 is pure d.c., to provide for outcoupling on path 8 while avoiding AM on the output beam 7.

When AM and FM are simultaneously employed in this invention, $f_r$ and $\Delta f$ should be synchronized with $f_m$ so that range ambiguities will be avoided. This is accomplished by designing the system so that the following synchronization condition is satisfied:

$$df/dt = f_m F$$

where $df/dt$ is the rate of change of frequency with respect to time, as imparted by FM crystal 25; $f_m$ is the frequency of modulation imparted by AM crystal 21; and F, the amount of frequency broadening in the return signal, is equal to $k/t_d$, where k, a constant depending upon the pixel geometry and frequency, is approximately equal to 1, and $t_d$ is the dwell time of the output beam 7 on each pixel. F is the distance between half-power points on the curve representing the distribution of frequencies returned from the target after the latter is illuminated by output beam 7. This synchronization fixes the ambiguity range ($r_a$) of the AM portion of the system to be equal to the absolute range resolution of the FM portion of the system.

In designing a system, one typically selects $r_a$, which gives $f_m$ from the formula $f_m = c/2r_a$, the $t_d$, which gives F. $df/dt$ is then calculated from the above synchronization condition. Finally, a combination of $f_r$ and $\Delta f$ is selected which gives that $df/dt$. As stated previously, $\Delta f$ is normally made as high as practicable to aid in receiver processing, subject to the limitations of active lasing region 11 and/or FM crystal 25. For a given $df/dt$, the higher the $\Delta f$, the lower the $f_r$. $f_r$ should be lower than the pixel scan rate $f_p = 1/t_d$ because of the demands of laser radar, which requires much higher pixel scan rates than does microwave radar.

In a working embodiment, $r_a$ was selected to be 20 meters; thus, $f_m$ was 7.5 Mhz. $t_d$ was selected to be 1/50,000 of a second, and k was 1.0. Thus, F and $f_p$ were each 50 Khz and $df/dt$ was $3.75 \times 10^{11}$ Hz/sec. $\Delta f$ was 37.5 Mhz and $f_r$ was 5 Khz, well below the pixel scan rate $f_p$ of 50 Khz, as desired.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, the techniques described herein can be used for microwave radars as well as for radars operating at frequencies of light.

What is claimed is:

1. A laser radar transmitter comprising:
   an active lasing region disposed within a resonant laser cavity which is enclosed in an electrically conductive laser housing, said active lasing region producing a beam of circulating coherent radiation along an optical axis within said laser cavity; means for continuous simultaneous modulation of said coherent beam, said means including: a
   means for continuously amplitude modulating the circulating coherent beam, said AM means aligned with the active lasing region along the optical axis; and a
   means for continuously frequency modulating the circulating coherent beam, said FM means aligned with the active lasing region along the optical axis; and
   means for removing said continuously simultaneously modulated coherent radiation from said laser cavity.

2. The transmitter of claim 1 further comprising a wavelength selective device aligned along the optical axis for diverting a portion of the circulating coherent beam away from the optical axis, whereby said diverted portion exits the laser housing via a dielectric window in the laser housing and thus becomes available for use as a local oscillator for a laser receiver to receive return signals transmitted by the transmitter.

3. The transmitter of claim 1 wherein the radiation removing means comprises a beam splitter positioned within the laser cavity intermediate the AM means and the active lasing region, said beam splitter
   intersecting the optical axis and angled at the Brewster angle with respect thereto;
   whereby a portion of the circulating coherent beam is diverted away from the optical axis and exits the laser cavity via a dielectric window in the laser housing.

4. The transmitter of claim 1 wherein the AM means and FM means are each electro-optic crystals.

5. The transmitter of claim 4 wherein the AM crystal has field induced birefringence, and is oriented so that the change in the field-induced index of refraction of components of radiation orthogonal to the circulating coherent beam is equal in magnitude and opposite in sign to the change in field-induced index of refraction of the circulating coherent beam.

6. The transmitter of claim 4 wherein the FM crystal has field induced birefringence, and is oriented so that the change in field-induced index of refraction of components of radiation orthogonal to the circulating coherent beam is equal in magnitude and equal in sign to the change in field-induced index of refraction of the circulating coherent beam.

7. The transmitter of claim 4 wherein a driving voltage comprising a.c. is applied to the AM crystal, and a driving voltage is not applied to the FM crystal;

whereby the coherent radiation exiting the laser cavity is an amplitude modulated signal.

8. The transmitter of claim 4 wherein a driving voltage comprising a.c. is applied to the FM crystal, and a driving voltage comprising solely d.c. is applied to the AM crystal;

whereby the coherent radiation exiting the laser cavity is a frequency modulated signal.

9. The transmitter of claim 4 wherein driving voltages comprising a.c. are applied to each of the AM and FM crystals;

whereby the coherent radiation exiting the laser cavity is both amplitude and frequency modulated.

10. The transmitter of claim 9 wherein the exiting coherent radiation is controllably pointed towards a target that is optically divided into a plurality of pixels; and the rate of frequency change of the exiting radiation with respect to time, imparted by the FM crystal, is approximately equal to the product of the frequency of amplitude modulation imparted by the AM crystal and the rate at which the exiting radiation scans the pixels.

* * * * *